US010360409B2

(12) United States Patent
Park et al.

(10) Patent No.: US 10,360,409 B2
(45) Date of Patent: Jul. 23, 2019

(54) SYSTEM FOR CONTROLLING SMART CARD AND METHOD THEREOF

(75) Inventors: Young Chual Park, Yongin (KR); Tae Joon Yang, Seongnam (KR); Ki Jeong Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 777 days.

(21) Appl. No.: 12/666,219

(22) PCT Filed: Jun. 18, 2008

(86) PCT No.: PCT/KR2008/003442
§ 371 (c)(1),
(2), (4) Date: Aug. 20, 2010

(87) PCT Pub. No.: WO2009/002043
PCT Pub. Date: Dec. 31, 2008

(65) Prior Publication Data
US 2011/0004873 A1    Jan. 6, 2011

(30) Foreign Application Priority Data
Jun. 22, 2007 (KR) .......................... 10-2007-0061691

(51) Int. Cl.
*G06F 9/445*    (2018.01)
*G06F 21/00*    (2013.01)
(Continued)

(52) U.S. Cl.
CPC .......... *G06F 21/629* (2013.01); *H04W 12/04* (2013.01)

(58) Field of Classification Search
USPC ..................................... 705/50, 26; 709/222
See application file for complete search history.

(56) References Cited

U.S. PATENT DOCUMENTS 5,892,900 A * 4/1999 Ginter ..................... G06F 21/10
                                                    726/26
6,367,011 B1    4/2002 Lee et al.
(Continued)

FOREIGN PATENT DOCUMENTS

JP    2001-312325 A    11/2001
JP    2002-258966 A     9/2002
(Continued)

OTHER PUBLICATIONS

Pohls H.C., Posegga J. (2006) Smartcard Firewalls Revisited. In: Domingo-Ferrer J., Posegga J., Schreckling D. (eds) Smart Card Research and Advanced Applications. Cardis 2006. Lecture Notes in Computer Science, vol. 3928. Springer, Berlin, Heidelberg (Year: 2006).*

(Continued)

*Primary Examiner* — Edward Chang
*Assistant Examiner* — Murali K Dega
(74) *Attorney, Agent, or Firm* — IP Legal Services, LLC

(57) ABSTRACT

A system for managing smart cards is disclosed. A system for managing smart cards, comprises a key management server for managing at least one master key used to grant the right to manage a smart card which operates in conjunction with a mobile terminal, and generates an installation key, used to grant the right to install or store a predetermined applet, based on the master key, and a card management server for receiving the generated installation key, and provides the applet to the mobile terminal based on the installation key in response to a request from the mobile terminal.

15 Claims, 3 Drawing Sheets

(51) Int. Cl.
G06F 21/62 (2013.01)
H04W 12/04 (2009.01)

(56) References Cited

U.S. PATENT DOCUMENTS

| | | | |
|---|---|---|---|
| 6,880,084 B1* | 4/2005 | Brittenham | G06F 21/77 |
| | | | 705/66 |
| 7,925,892 B2 | 4/2011 | Przybilla | |
| 9,202,083 B2* | 12/2015 | Morris | G06F 21/62 |
| 9,584,624 B2* | 2/2017 | McCormick | H04L 67/34 |
| 2001/0037403 A1 | 11/2001 | Mougi et al. | |
| 2003/0092434 A1 | 5/2003 | Irisawa | |
| 2004/0015958 A1 | 1/2004 | Veil et al. | |
| 2006/0093149 A1* | 5/2006 | Zhu | H04L 63/0442 |
| | | | 380/277 |
| 2006/0196931 A1 | 9/2006 | Holtmanns et al. | |
| 2009/0235352 A1 | 9/2009 | Schrijen et al. | |
| 2009/0320118 A1* | 12/2009 | Muller | G06F 21/34 |
| | | | 726/9 |
| 2010/0122094 A1* | 5/2010 | Shima | H04L 63/123 |
| | | | 713/189 |
| 2010/0313034 A1* | 12/2010 | Senshu | G06F 21/10 |
| | | | 713/185 |

FOREIGN PATENT DOCUMENTS

| | | |
|---|---|---|
| JP | 2004-030238 A | 1/2004 |
| JP | 2006-522976 A | 10/2006 |
| KR | 1020030081817 A | 10/2003 |
| KR | 1020040079166 A | 9/2004 |
| KR | 1020050014429 A | 2/2005 |
| KR | 1020050098365 A | 10/2005 |
| WO | 99/19846 A2 | 4/1999 |
| WO | 02/093370 A1 | 11/2002 |
| WO | 2004/088603 A1 | 10/2004 |
| WO | 2006/061754 A1 | 6/2006 |

OTHER PUBLICATIONS

Sanchez D.D., Lopez A.M., Mendoza F.A. (2006) A Smart Card Solution for Access Control and Trust Management for Nomadic Users. In: Domingo-Ferrer J., Posegga J., Schreckling D. (eds) Smart Card Research and Advanced Applications. Cardis 2006.  (Year: 2006).*

International Search Report for PCT/KR2008/003442 filed Jun. 18, 2008.

* cited by examiner

SYSTEM FOR CONTROLLING SMART CARD AND METHOD THEREOF

TECHNICAL FIELD

The present invention relates to a system and method for managing smart cards.

BACKGROUND ART

A smart card is an electronic card in which an Integrated Circuit (IC) chip, provided with a micro processor and an operating system which have self-arithmetic functions, memory, and an encryption algorithm, is attached onto the surface of a plastic card, which has the same material and size as a general credit card.

Since smart cards can store and process a large amount of information and operations, and provide excellent security function, the necessity for smart cards has increased. For example, such a smart card can be used for finance, communication, medical services, security services, and broadcasting.

A Smart card Management System (SCMS) for installing, deleting, and updating an application (hereinafter referred to as an 'applet'), thereby enabling various types of additional services to be used, has become required for smart cards.

Here, the SCMS is a system for managing all the data of a card as related to the type, manufacture and memory, and individual characteristics of each card, and managing applets for application to the card.

Meanwhile, not only terminal information but also various applets are installed in a smart card. Therefore, a collision about the right to manage a smart card between a mobile communication company, which provides the smart card, and an affiliated company, which provides applets, is unavoidable.

Therefore, research into a system and method for effectively managing a smart card on which various applets are installed must be performed.

DISCLOSURE

Accordingly, the present invention has been made keeping in mind the above problems occurring in the prior art, and an object of the present invention is to provide a system and method for managing smart cards, which causes a third organization to possess master keys, used to grant the right to manage respective smart cards, thereby effectively managing of the smart cards.

In order to delete an applet installed or stored in a smart card, the deletion of the applet should be approved by an affiliated company which provided the applet. Therefore, another object of the present invention is to provide a system and method for managing smart cards, which secures the independence of additional services provided by an affiliated company.

For this purpose, a system for managing smart cards according to an aspect of the present invention, includes a key management server for managing at least one master key used to grant the right to manage a smart card which operates in conjunction with a mobile terminal, and generating an installation key, used to grant the right to install or store a predetermined applet, based on the master key; and a card management server for receiving the generated installation key, and providing the applet to the mobile terminal based on the installation key in response to a request from the mobile terminal.

A system for managing smart cards according to another aspect of the present invention, includes a key management server for managing at least one master key used to grant the right to manage a smart card which operates in conjunction with a mobile terminal, and generating a delete key used to grant the right to delete an installed or stored applet based on the master key; and a card management server for receiving the generated delete key, and providing approval to the mobile terminal to delete the applet based on the delete key in response to a delete request from the mobile terminal.

A method of managing smart cards according to another aspect of the present invention, includes receiving an applet transmission message, including an applet requested by a mobile terminal, from an applet management server; performing cross-certification in conjunction with the mobile terminal based on a pre-stored installation key used to grant the right to install the applet included in the received applet transmission message; and transmitting the applet transmission message to the mobile terminal if the cross-certification is successful.

A method of managing smart cards according to another aspect of the present invention, includes receiving an applet delete approval message, approving deletion of an applet requested by a mobile terminal, from an applet management server; generating a delete key used to grant the right to delete the applet when receiving the applet delete approval message; and transmitting an applet delete approval message including the generated delete key to a card management server.

DESCRIPTION OF REFERENCE NUMERALS OF PRINCIPAL ELEMENTS IN THE DRAWINGS

Figure 1:
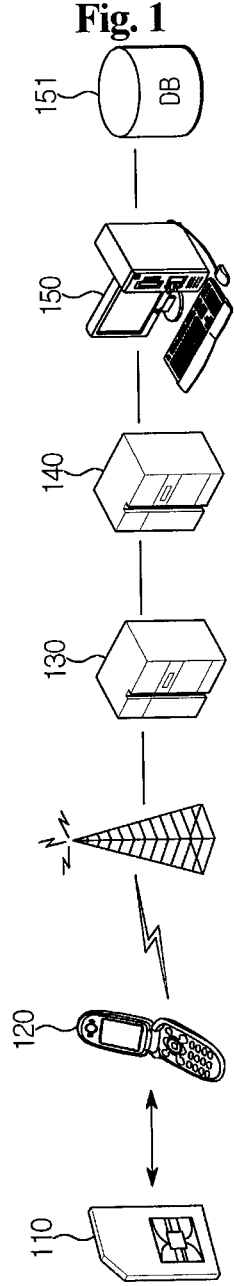
FIG. 1 is a diagram showing an example of the schematic configuration of a system according to an embodiment of the present invention.

110: smart card
120: mobile terminal
130: card management server
140: key management server
150: applet management server
151: database

BEST MODEL

Mode for Invention

A system and method for managing smart cards according to an embodiment of the present invention with reference to attached FIGS. 1 to 3 will be described in detail below.

Here, a smart card may indicate any one of a Subscriber Identification Module (SIM) card, a Universal Subscriber Identification Module (USIM) card, a User Identification Module (UIM) card, and a Removable User Identification Module (RUIM) card, which are capable of being installed on the mobile terminal or detachably attached to the mobile terminal.

The present invention proposes to grant the right to mange a smart card to a third organization instead of a mobile communication company which provides the smart card and an affiliated company which provides an application (herein after referred to as an 'applet') used for additional services.

For this purpose, the present invention causes a third organization to possess and manage a master key which can grant the right to manage a smart card.

FIG. 1 is a diagram showing an example of the schematic configuration of a system according to an embodiment of the present invention.

As shown in FIG. 1, a system for managing smart cards according to the present invention may include a smart card 110, a mobile terminal 120, a card management server 130, a key management server 140, an applet management server 150, and a database 151.

The smart card 110 may include terminal information, related to the mobile terminal, and applets, used for various additional services. Therefore, the mobile terminal 120 may request an applet to be installed or stored in the smart card 110 or may request an installed or stored applet to be deleted.

The key management server 130 may possess and manage master keys, each of which matches a smart card which operates in conjunction with a mobile terminal, and which grant the right to install and store a predetermined applet in the smart card or delete the predetermined applet from the smart card.

The key management server 140 can generate an installation key, used to grant only the right to install or store an applet in a smart card corresponding to the master key, based on the master key. The key management server 140 can generate a delete key, used to grant only the right to delete the applet installed or stored in a smart card corresponding to a master key, based on the master key.

The applet management server 150 may be a server managed by an affiliated company. The applet management server 150 can search a database for an applet and then provide the found applet. Further, the applet management server 150 can determine whether to delete the applet according to an applet delete request.

The database 151 operates in conjunction with the applet management server 150, and can construct and manage an applet desired to be installed or stored in the smart card 110.

The present invention can install or store an applet in a smart card based on the installation key and can delete the installed or stored applet based on the delete key, both the installation key and the delete key being derived from the master key.

As described above, the present invention causes a third organization to possess a master key used to grant the right to manage a smart card, thereby effectively managing the smart card.

Figure 2:
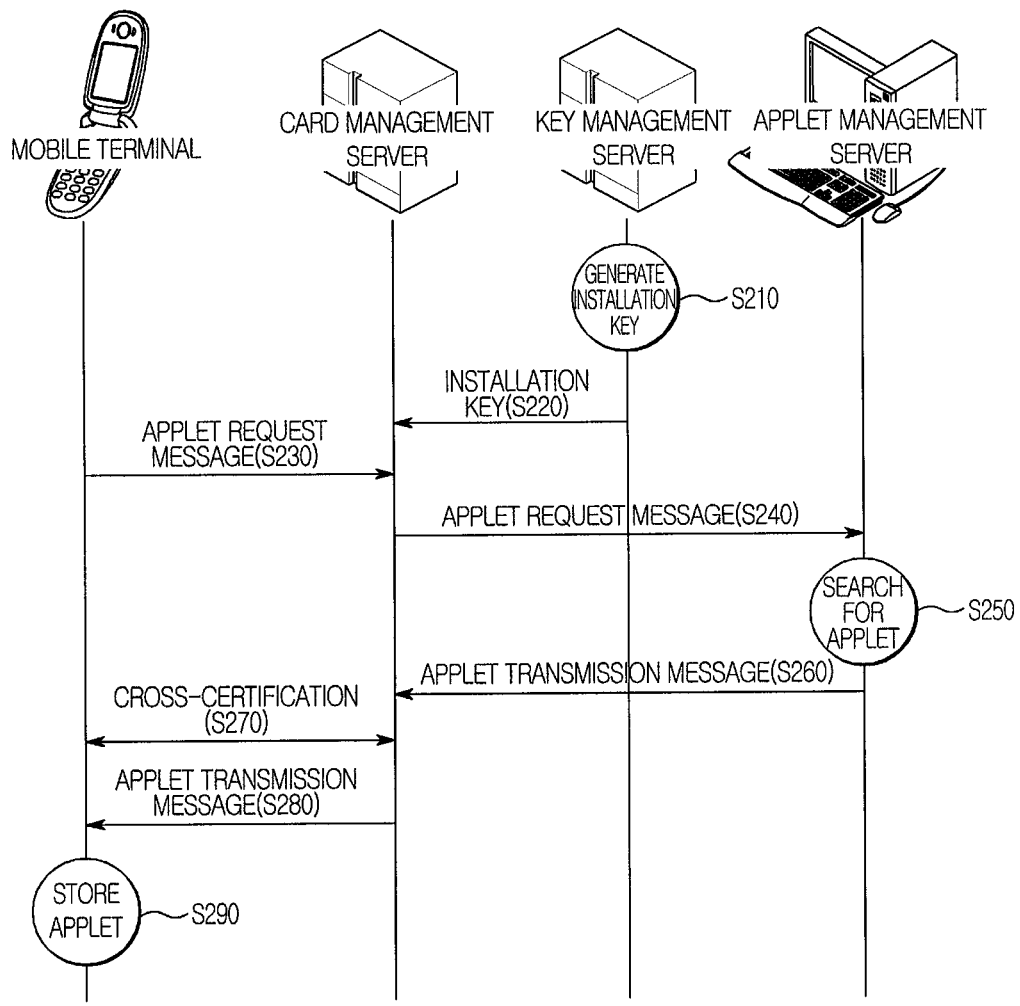
FIG. 2 is a first flowchart showing a method of managing smart cards according to an embodiment of the present invention.

FIG. 2 is a first flowchart showing a method of managing smart cards according to an embodiment of the present invention.

As shown in FIG. 2, since the key management server possesses master keys corresponding to respective smart cards which have been previously registered, the key management server can generate an installation key, used to grant the right to install or store an applet in a smart card corresponding to one of the master keys, based on the master key at step S210.

The key management server can provide the generated installation key to a mobile terminal at step S220 beforehand.

When a user requires an applet, the mobile terminal can generate an applet request message requesting the applet desired to be installed or stored in a smart card which operates in conjunction with the mobile terminal.

The mobile terminal can transmits the generated applet request message to the card management server at step S230. The card management server can transmit the applet request message to the applet management server at step S240.

When the applet management server receives the applet request message, the applet management server can search the database for an applet corresponding to the applet request message at step S250. The applet management server can generate an applet transmission message transmitting the found applet.

The applet management server can transmit the generated applet transmission message to the card management server at step S260.

Therefore, when the card management server receives the applet transmission message, the card management server can perform cross-certification in conjunction with the mobile terminal based on the pre-stored installation key at step S270.

If the cross-certification is successful, the card management server can provide the applet transmission message which it has received to the mobile terminal at step S280.

Finally, when the mobile terminal receives the applet transmission message, the mobile terminal can extract the applet included in the applet transmission message and then install or store the extracted applet in the smart card at step S290.

The present invention can generate and provide an installation key, used to grant only the right to install or store an applet in a smart card, beforehand in a process of registering the smart card. Therefore, the present invention can freely install or store an applet in response to a user's request.

Meanwhile, in the case of deleting an applet installed or stored in a smart card, the present invention proposes a method of securing the independence of additional services corresponding to the applet. For this purpose, the present invention can receive approval to delete an applet, corresponding to relevant additional services, from an affiliated company for providing additional services, and then generate and provide a delete key used to grant only the right to delete an applet.

Figure 3:
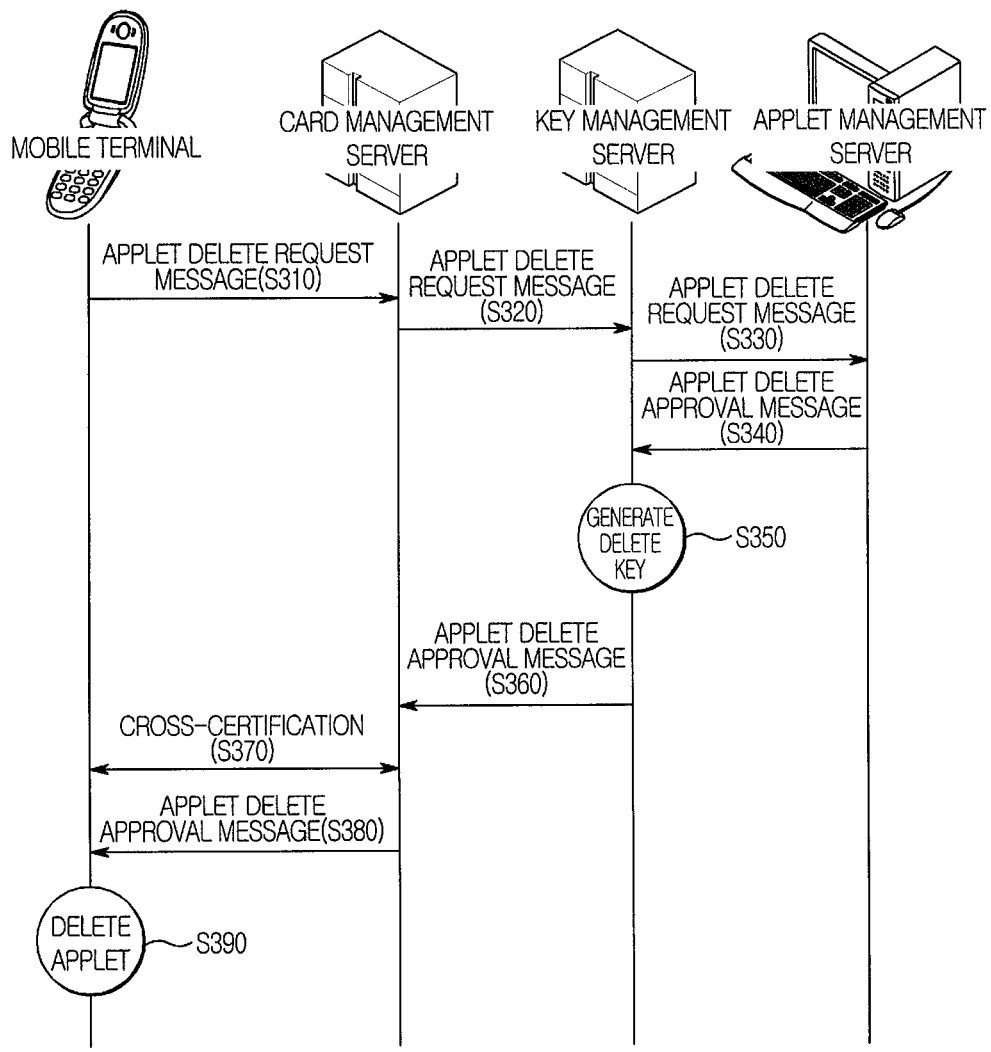
FIG. 3 is a second flowchart showing a method of managing smart cards according to an embodiment of the present invention.

FIG. 3 is a second flowchart showing a method of managing smart cards according to an embodiment of the present invention.

As shown in FIG. 3, when a user wants to delete an applet, the mobile terminal can generate an applet delete request message requesting deletion of an applet installed or stored in a smart card which operates in conjunction with the mobile terminal in response to a request from a user.

The mobile terminal can transmit the generated applet delete request message to the card management server at step S310.

The card management server can receive the applet delete request message, and then transmit the received applet delete request message to the key management server at step S320. The key management server can transmit the applet delete request message to the applet management server at step S330.

When the applet management server receives the applet delete request message, the applet management server can determine whether to delete the applet corresponding to the applet delete request message. That is, when it is decided to delete the applet, the applet management server can generate an applet delete approval message used to delete the applet.

Thereafter, the applet management server can transmit the generated applet delete approval message to the key management server at step S340.

When the key management server receives the applet delete approval message, the key management server can generate a delete key used to grant the right to delete an applet corresponding to the applet delete approval message at step S350.

Here, the delete key may mean a temporarily generated key to which only the right to delete a single applet is granted, and which can be used for a predetermined time period. The reason for this is to protect other applets installed or stored in the smart card.

Therefore, the key management server can add the generated delete key to the applet delete approval message. The key management server can transmit the applet delete approval message, to which the delete key has been added, to the card management server at step S360.

When the card management server receives the applet delete approval message including the delete key, the card management server can perform cross-certification in conjunction with the mobile terminal, based on the delete key, at step S370.

If the cross-certification is successful, the card management server can transmit the applet delete approval message to the mobile terminal at step S380.

In the result, when the mobile terminal receives the applet delete approval message, the mobile terminal can delete a predetermined applet installed or stored in the smart card, based on the applet delete approval message at step S390.

As described above, in the present invention, in order to delete an applet installed or stored in the smart card, an approval to delete the applet is required from the affiliated company which provided the applet, so that the affiliated company can secure the independence of additional services.

The system and method for managing smart cards according to the present invention can be modified and applied in various forms within the scope of the technical spirit of the present invention, and is not limited to the above-described embodiments. Further, the preferred embodiments and drawings of the present invention have been disclosed not for the purpose of limiting the scope of the technical spirit of the present invention but for the purpose of describing the present invention in detail. In the above-described present invention, since it will be understood by those skilled in the art that various substitutions, modifications, and changes may be made without departing from the technical spirit of the invention, the present invention is not limited to the embodiments and attached drawings, and the scope of the present invention must be determined by including all the following claims and equivalents.

The invention claimed is:

1. A system of managing a smart card and preventing a collision on the right to manage the smart card between a mobile communication company which provides the smart card and an affiliated company which provides applets, comprising:

a key management server, managed by a third party, configured to possess master keys corresponding to respective smart cards which have been previously registered, and provide an installation key and a delete key to a card management server, wherein the master key is used to grant the right to manage the smart card and is used for generation of the installation key associated with an applet installation and the delete key associated with an applet deletion, wherein the smart card is configured to operate in conjunction with a mobile terminal and possesses a terminal information of the mobile terminal and the applets used for a plurality of additional services, wherein the key management server generates the installation key based on the master key, and wherein the installation key is generated separately from the delete key; and wherein the card management server, managed by the third party, is configured to receive the generated installation key from the key management server, the card management server further configured to:

receive a request message for a requested applet from the mobile terminal, transmit the received request message for the requested applet to an applet management server which managed by the affiliated company, receive the requested applet from the applet management server in response to the request message, and perform cross-certification in conjunction with the mobile terminal based on the installation key previously stored in the card management server, and provide the requested applet to the mobile terminal according to a result of the cross-certification, wherein the key management server provides the generated installation key to the mobile terminal beforehand.

2. A system of managing a smart card and preventing a collision on the right to manage the smart card, comprising:

a key management server configured to manage a master key, wherein the master key is used to grant the right to manage the smart card and is used for generation of an installation key associated with an applet installation and a delete key associated with an applet deletion, wherein the smart card is configured to operate in conjunction with a mobile terminal, and the key management server is further configured to:

receive an approval message from an applet management server to delete an applet requested by the mobile terminal and generate the delete key based on the master key, wherein the delete key is generated separately from the installation key; and a card management server configured to:

receive an applet delete message from the mobile terminal and transmit the applet delete message request to the key management server, receive the generated delete key from the key management server, and perform cross-certification based on the received delete key in conjunction with the mobile terminal and provide the approval message with the received delete key to the mobile terminal in order to allow the mobile terminal to delete the applet when the cross-certification is successful.

3. A method of managing a smart card and preventing a collision on the right to manage the smart card, the method, comprising:

generating, by a key management server, an installation key based on a master key, wherein the installation key is configured to grant the right to install or store an applet in a smart card, wherein the master key is configured to manage the smart card and is used for generation of an installation key associated with an applet installation and a delete key associated with an applet deletion, wherein the installation key is generated separately from the delete key, and wherein the smart card is configured to operate in conjunction with a mobile terminal;

receiving, by a card management server, the installation key from the key management server;

receiving, by the card management server, an applet request message from the mobile terminal;

transmitting, by the card management server, the applet request message to an applet management server;

receiving, by the card management server, an applet transmission message from the applet management server; and performing, by the card management server, a cross-certification in conjunction with the mobile terminal based on the installation key previously stored by the card management server; and transmitting the applet transmission message to the mobile terminal if the cross-certification is successful.

4. A method of managing a smart card and preventing a collision on the right to manage the smart card, the method, comprising:

managing; by a key management sever, a master key associated with a smart card, the master key configured to manage the smart card wherein the smart card is configured to operate in conjunction with a mobile terminal and the master key is used for generation of an installation key associated with an applet installation and a delete key associated with an applet deletion;

receiving, by a card management server, an applet delete request message, wherein the card management server receives the applet delete request message from the mobile terminal, and transmitting the applet delete request message to an applet management server;

receiving, by the key management server, an applet delete approval message from the applet management server, and generating the delete key based on the master key, wherein the delete key is generated separately from the installation key;

receiving, by the card management server, the applet delete approval message and the delete key from the key management server, and performing a cross-certification in conjunction with the mobile, and transmitting the approval message with the received delete key to the mobile terminal in order to allow the mobile terminal to delete the applet when the cross-certification is successful.

5. The system according to claim 2, wherein the smart card is any one of a Subscriber Identification Module (SIM) card, a Universal Subscriber Identification Module (USIM) card, a User Identification Module (UIM) card, and a Removable User Identification Module (RUIM) card, which can be installed on the mobile terminal or detachably attached to the mobile terminal.

6. The system according to claim 1, wherein the applet request message is configured to request a predetermined applet desired to be installed in the smart card.

7. The system according to claim 2, wherein the applet delete request message is configured to request deletion of a predetermined applet installed or stored in the smart card.

8. The method according to claim 3, wherein the smart card is any one of a Subscriber Identification Module (SIM) card, a Universal Subscriber Identification Module (USIM) card, a User Identification Module (UIM) card, and a Removable User Identification Module (RUIM) card, which can be installed on the mobile terminal or detachably attached to the mobile terminal.

9. The method according to claim 4, wherein the smart card is any one of a Subscriber Identification Module (SIM) card, a Universal Subscriber Identification Module (USIM) card, a User Identification Module (UIM) card, and a Removable User Identification Module (RUIM) card, which can be installed on the mobile terminal or detachably attached to the mobile terminal.

10. The system according to claim 1, wherein the installation key is configured to grant only a right to install or store the predetermined applet in the smart card corresponding to the master key.

11. The system according to claim 1, wherein the smart card is any one of a Subscriber Identification Module (SIM) card, a Universal Subscriber Identification Module (USIM) card, a User Identification Module (UIM) card, and a Removable User Identification Module (RUIM) card, which can be installed on the mobile terminal or detachably attached to the mobile terminal.

12. The system according to claim 2, the delete key is configured to grant only the right to delete the predetermined applet installed or stored in the smart card corresponding to the master key.

13. The system according to claim 12, wherein the delete key is a temporarily generated key to which only the right to delete a single applet is granted and which can be used only for a predetermined time period.

14. The method according to claim 3, wherein the applet request message is generated by the mobile terminal and configured to request a predetermined applet desired to be installed in the smart card.

15. The method according to claim 4, wherein the applet delete request message is generated by the mobile phone and configured to request deletion of a predetermined applet installed or stored in the smart card.

* * * * *

UNITED STATES PATENT AND TRADEMARK OFFICE
CERTIFICATE OF CORRECTION

PATENT NO. : 10,360,409 B2  
APPLICATION NO. : 12/666219  
DATED : July 23, 2019  
INVENTOR(S) : Young Chual Park et al.

Page 1 of 1

It is certified that error appears in the above-identified patent and that said Letters Patent is hereby corrected as shown below:

In the Specification

Column 1, Line 4, before the "TECHNICAL FIELD", insert the following paragraph:
--CROSS REFERENCE TO RELATED APPLICATIONS
This application is a National Stage Patent Application of PCT International Patent Application No. PCT/KR2008/003442 (filed on June 18, 2008) under 35 U.S.C. §371, which claims priority to Korean Patent Application No. 10-2007-0061691 (filed on June 22, 2007), the teachings of which are incorporated herein in their entireties by reference.--.

In the Claims

Claim 4, Column 7, Line 17, replace "managing;" with --managing,--.

Signed and Sealed this  
Twenty-second Day of October, 2019

Andrei Iancu  
*Director of the United States Patent and Trademark Office*